United States Patent
Belz

(10) Patent No.: US 7,348,998 B2
(45) Date of Patent: Mar. 25, 2008

(54) METHOD FOR ORIENTING A DIGITAL IMAGE ON A DISPLAY OF AN IMAGE DISPLAY DEVICE

(75) Inventor: Steven M. Belz, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 645 days.

(21) Appl. No.: 10/833,396

(22) Filed: Apr. 28, 2004

(65) Prior Publication Data

US 2005/0243196 A1 Nov. 3, 2005

(51) Int. Cl.
*G09G 5/00* (2006.01)
*G06K 9/32* (2006.01)
*H04N 5/222* (2006.01)

(52) U.S. Cl. ............... 345/649; 345/173; 345/650; 345/652; 345/656; 345/659; 382/276; 382/296; 382/297; 348/333.01

(58) Field of Classification Search ........... 345/173, 345/649–659; 382/276, 293–300
See application file for complete search history.

(56) References Cited

U.S. PATENT DOCUMENTS 6,396,506 B1 * 5/2002 Hoshino et al. ............ 345/650

FOREIGN PATENT DOCUMENTS

WO 00/60545 10/2000

OTHER PUBLICATIONS

U.S. Appl. No. 10/299,384 filed Nov. 19, 2002; Method for Orienting a Digital Image on a Display of an Image Display Device; Inventor Duane Woodworth.

* cited by examiner

*Primary Examiner*—My-Chau T. Tran
(74) *Attorney, Agent, or Firm*—David A. Novais; Kathleen Neuner Manne

(57) ABSTRACT

The method of capturing a digital image for viewing from a stream of digital images on a touch display of a digital imaging device includes accessing a stream of digital images comprised of a plurality of individual digital images, selecting an individual image from the stream of digital images by touching the touch display, and automatically saving the selected individual image to a storage device. The method of orienting a digital image for viewing on a touch display of a digital imaging device includes accessing the digital image, the digital image being defined by a plurality of sides, displaying the digital image in a first orientation on the touch display with four corners of the digital imaging device, the display, providing selection means for select at least one of the corners; and automatically displaying the digital image in a second orientation responsive to the selecting of one of the corners.

10 Claims, 6 Drawing Sheets

METHOD FOR ORIENTING A DIGITAL IMAGE ON A DISPLAY OF AN IMAGE DISPLAY DEVICE

FIELD OF THE INVENTION

The present embodiment relate generally to consumer photography and to the capture and manipulation of digital photographic mementos. Particularly, the present embodiments relate to methods of orienting a digital image for viewing on a touch display of a digital imaging device and methods.

BACKGROUND OF THE INVENTION

Displaying and viewing digital images on a display of a digital imaging device, such as on a display of a digital camera or kiosk, is known in the prior art, such as Von Wertzeichen WO 00/60545. When the digital image is shown on the display, the digital image may not be properly oriented. For example, the digital image might be displayed upside down or the digital image might need to be oriented sideways on the display. Accordingly, the viewer would need to turn or twist their head in order to view the person in the proper orientation.

Alternatively, many digital images devices allow the viewer to rotate the digital image. Such rotation is typically accomplished by displaying a "rotate picture" button on the display proximate to the digital image. Once selected, the digital image is typically rotated by 90 degrees. Since the image is rotated only by 90 degrees, the viewer may need to select the rotate picture button several times. For example, if the picture is out of orientation by 180 degrees, the viewer must select the "rotate picture" button twice to orient properly the digital image on the display.

While such methods have worked, a need exists for a method to enable a viewer to know the direction that a picture will be rotated, thereby, lessening the exasperation with the rotation process. A need exists for a more interactive process, directly correlated to the image itself, such as using a touch screen that enables rotation on a personalized level.

The present embodiments described herein were designed to meet these needs.

SUMMARY OF THE INVENTION

A method of orienting a digital image for viewing on a display of a digital imaging device entails accessing the digital image. The digital image is defined by a plurality of sides with sides being substantially linear. The method continues by displaying the digital image in a first orientation on the display of the digital imaging device, wherein the display has four corners. A selection means is provided in order to select at least one of the corners. The digital image in a second orientation is automatically displayed responsive to the selecting of one of the corners. The second orientation is configured such that the digital image rotates up to 360 degrees from the first orientation in the direction of the selected corner.

A method of capturing a digital image for viewing from a stream of digital images on a touch display of a digital imaging device entails accessing a stream of digital images comprised of numerous individual digital images, selecting an individual image from the stream of digital images by touching the touch display, and automatically saving the selected individual image to a storage device.

The embodied methods provide a manner of direct interaction with the objects whiting a graphical user interface. The embodied methods provide a decrease in time needed to perform tasks, such as rotating an image interacting with a menu structure. The methods provide a decreased learning curve associated with learning anew interface and provides an increase in simplicity resulting in increased usability of a user interface.

BRIEF DESCRIPTION OF THE DRAWINGS

In the detailed description of the preferred embodiments presented below, reference is made to the accompanying drawings, in which.

The present embodiments are detailed below with reference to the listed Figures.

DETAILED DESCRIPTION OF THE INVENTION

Before explaining the present embodiments in detail, it is to be understood that the embodiments are not limited to the particular descriptions and that it can be practiced or carried out in various ways.

The methods described herein provide for direct manipulation of a digital image, such as rotating, image capture, and image modification. The direct manipulation of images using the methods described herein is handled more efficiently and more effectively through the direct interaction with the object within a graphical user interface.

Figure 1A:
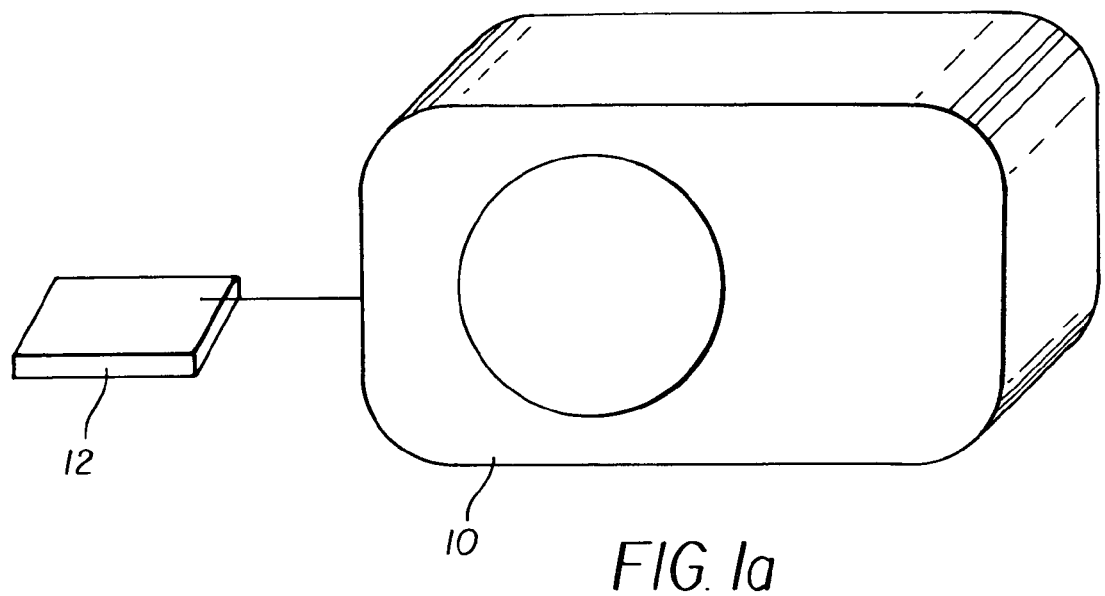
FIG. 1a depicts a perspective view of a digital imaging device usable with the method.
Figure 1B:
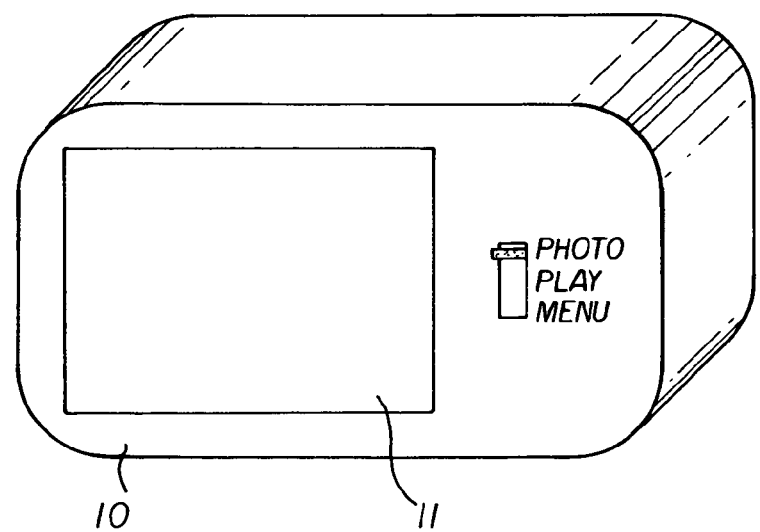
FIG. 1b depicts a perspective view of a digital imaging device usable with the method.

With reference to the figures, FIG. 1a and FIG. 1b show a digital imaging device 10 usable in the scope of the embodied method. The digital imaging device can be a digital camera adapted to capture images in electronic form and display the digital image on a display 11. The digital images are stored on a removable memory device, such as a memory stick or card 12. The digital images can be simply saved on an internal device that can be connected to a digital imaging display.

Figure 2:
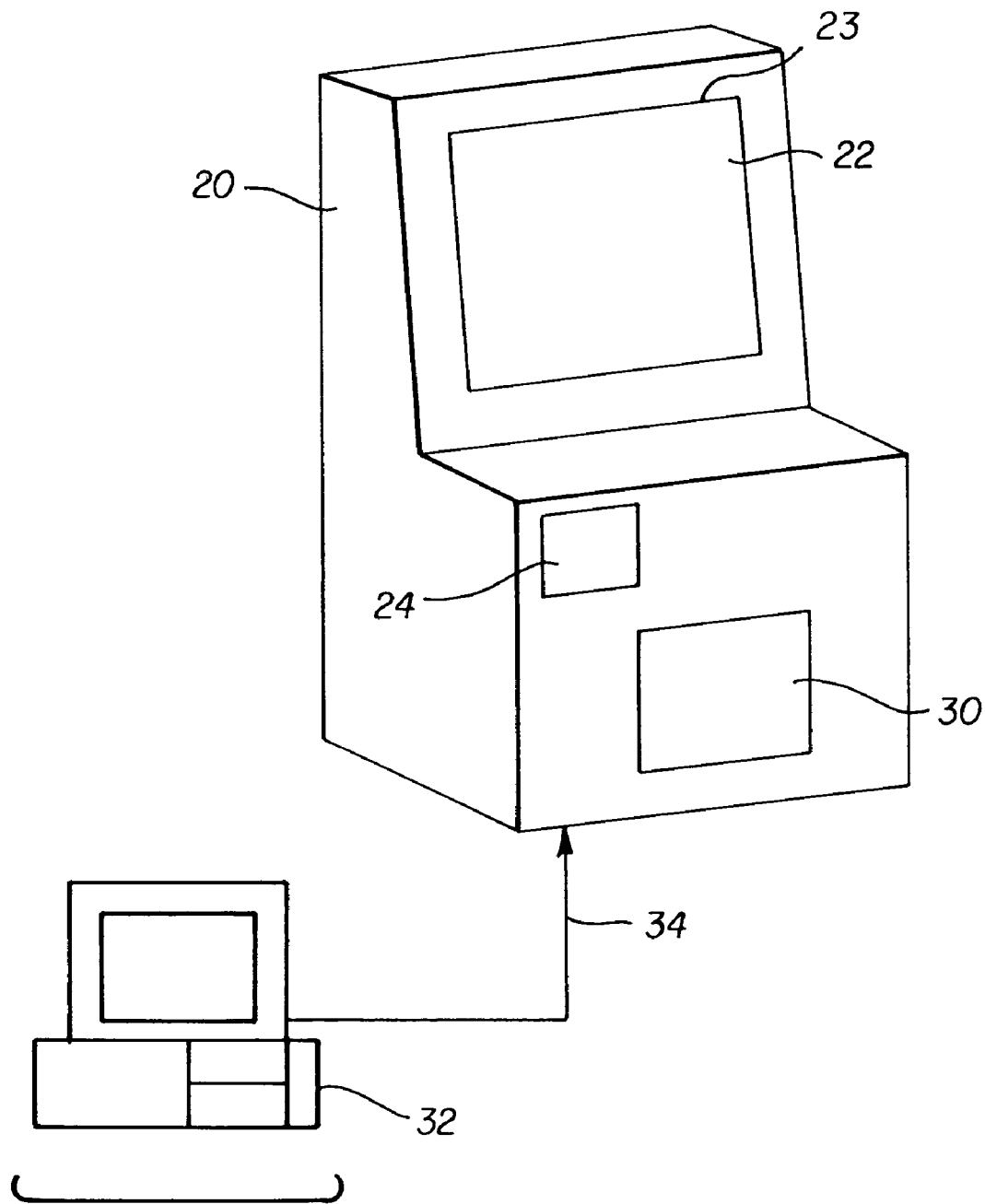
FIG. 2 depicts a general schematic of a digital imaging device configured as a kiosk.

FIG. 2 shows a digital imaging device configured as a kiosk 20. For ease of discussion, the embodied method will be discussed with regard to a kiosk. The method contemplates that the method can be employed by other digital memory devices.

An example of kiosk 20 is a Picture Maker™ kiosk produced by Eastman Kodak Company. Kiosk 20 includes a touch display 22 for displaying a digital image and an input port 24 adapted to receive a digital storage device. Examples of digital storage devices are memory cards, memory sticks, media cards, compact flash cards, floppy disks, compact discs, PictureCDs, or the like, as known to those skilled in the art.

The touch display 22 includes a top edge 23 that is oriented along the x-axis at the farthest y-axis position. A user's finger or stylus can be used for selection of a desired rotation on the touch display 22.

Kiosk 20 can optionally include an optional delivery section 30 controlling the delivery of a medium having the selected image that has been rotated.

A digital file with a digital image can be transmitted to or from the kiosk 20 or, in an alterative, can be transmitted to or from another display device, such as a server, a digital mini-lab, a wholesale lab, a remote computer or other digital device 32. The transmission typically occurs over a communication network 34.

Figure 3:
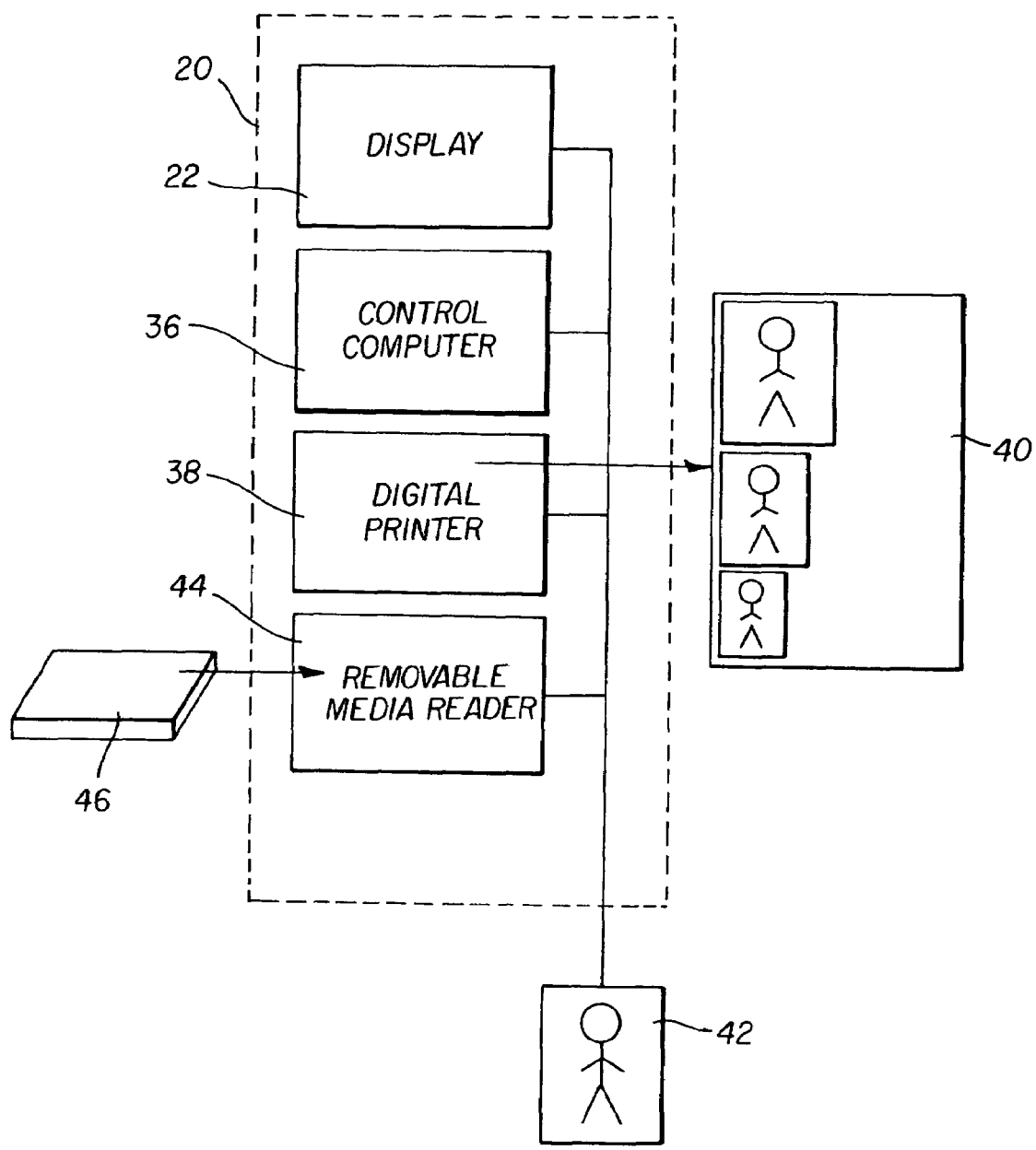
FIG. 3 depicts a general schematic of included kiosk functions.

FIG. 3 generally shows a diagram of included functions of the kiosk 20. As illustrated, the kiosk 20 can include a computer 36 that typically manages the flow of information and functionality of the components of the kiosk 20. The kiosk can internally include a printer 38, such as a Kodak Digital Science Model 8650 manufactured by Eastman Kodak Company. Printer 38 responds to commands from the computer 36 for forming an image on a medium, such as thermal or ink-jet paper. FIG. 3 depicts the embodiment wherein the output image 40 is formed from an input image 42. One method of receiving a digital image is illustrated by a removable media reader 44 disposed internal to input port 24 for receiving removable media 46. Examples of removable media 46 are memory cards, floppy disks, compact discs, PictureDCs, or other forms of removable media used in transferring digital files.

Figure 4:
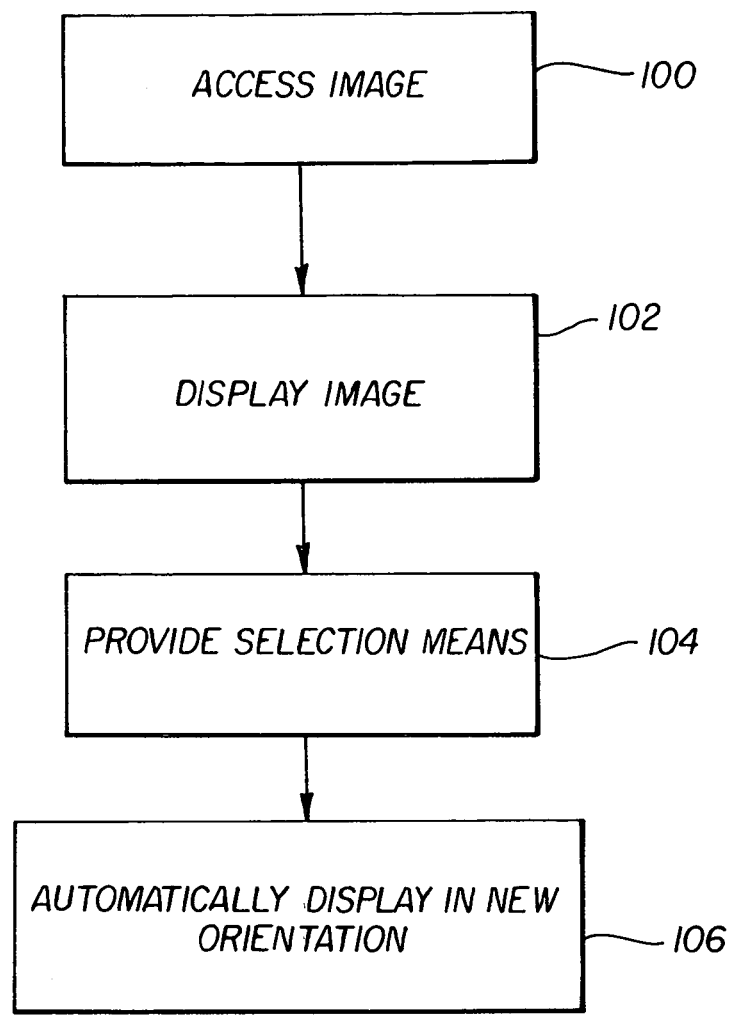
FIG. 4 depicts a general flow diagram of a method of orienting a digital image for viewing on a touch display of a digital imaging device.

The inventive method handles situations when a digital image displayed on a display 22 is not properly oriented for the content of the digital image. The method is manner of orienting a digital image for viewing on a display of a digital imaging device. FIG. 4 shows a flow diagram of an embodied manner of orienting a digital image.

The initial step entails accessing the digital image (Step 100). The digital image had a plurality of sides, wherein each side is substantially linear. The digital image is displayed on a touch display in a first orientation on the display of the digital imaging device (Step 102). The display includes four corners.

The method continues by providing selection means in order to select at least one of the corners (Step 104). The digital image is automatically displayed in a second orientation responsive to the selected corners (Step 106). The second orientation is configured such that the digital image rotates up to 360 degrees from the first orientation in the direction of the selected corner.

Figure 5:
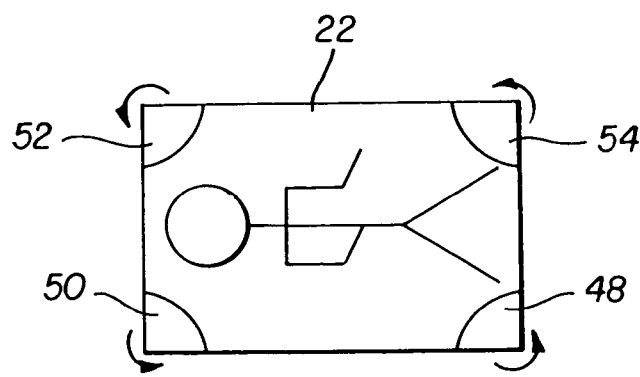
FIG. 5 depicts a view of the touch display 22 with four corners.

FIG. 5 shows the touch display 22 with a first corner 48, a second corner 50, a third corner 52 and a fourth corner 54. The display can rotate either clockwise or counterclockwise. FIG. 5 depicts the display rotating counterclockwise. The arrows in FIG. 5 depict the rotation.

Figure 6:
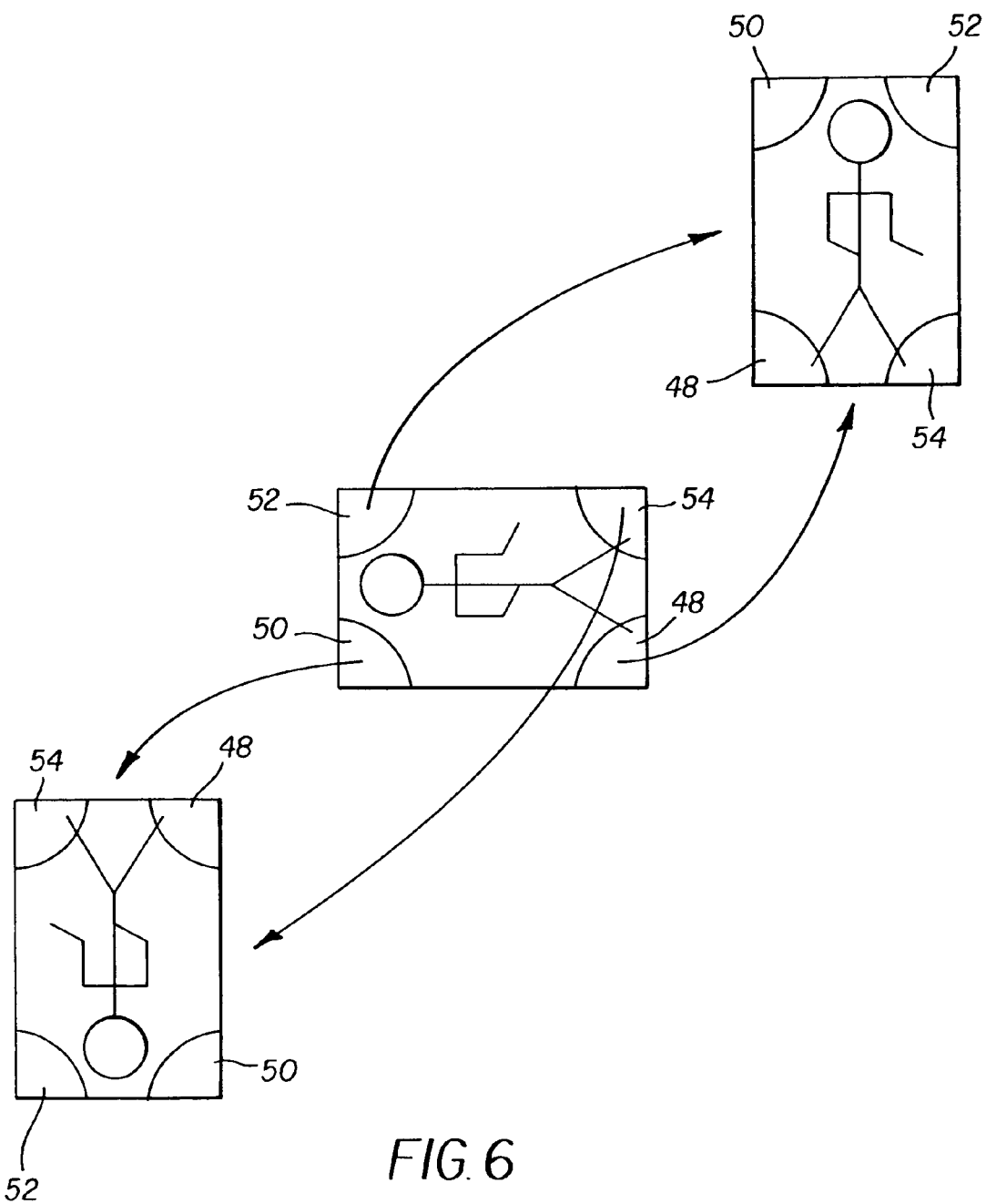
FIG. 6 depicts a sequence of the method for of rotating the image.

FIG. 6 shows an embodiment of the image rotated as part of the method. The image is shown initially at a first position 108. A first corner 48 is selected. The image rotates to a second orientation 110. The first corner 48 is again selected and the image rotates to a third orientation 112.

The digital image does not need to be of a rectangular or parallelogram shape. Other shapes with substantially linear sides can be employed by the method. Examples of other shapes usable with the method include hexagonal, triangular, square, or the like.

The method contemplates that the digital image can be rotated between 1 and 90 degrees from the first orientation in the direction of the selected corner. In another embodiment, the digital image can be rotated in increments of 5 degrees each time the corner is selected. In still another embodiment, the digital image is rotated for as long as touch is maintained on the touch display. The digital image continues to rotate in the direction of the corner until the touch display is no longer touched.

The touch display contemplated by the method can be a pressure sensitive overlay on an LCD display or a membrane adapted to detect and induction from a device.

The method can be a computer storage product with at least one computer storage medium. The computer storage medium includes instructions stored therein to cause one or more computers to perform the methods taught herein.

Figure 7:
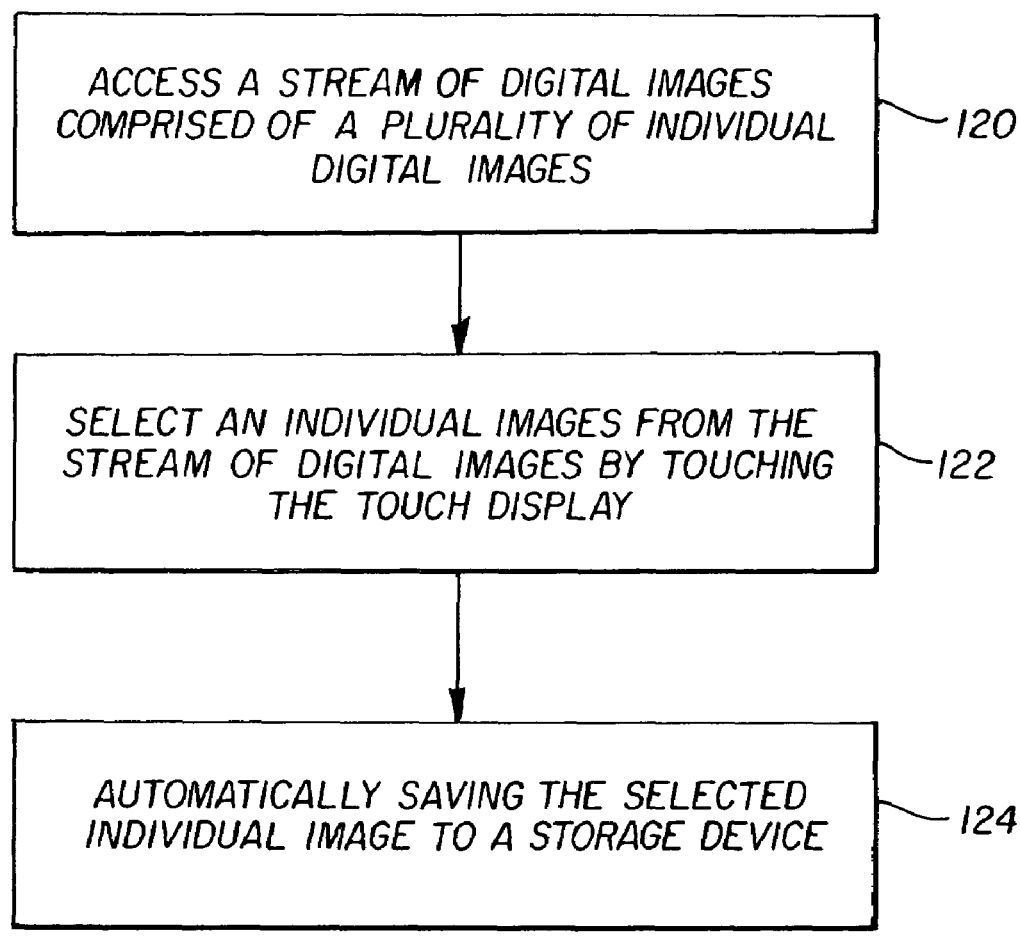
FIG. 7 depicts a general flow diagram of a method of capturing a digital image for viewing from a stream of digital images on a touch display of a digital imaging device.

FIG. 7 depicts the method of capturing a digital image for viewing from a stream of digital images on a touch display of a digital imaging device. The method begins by accessing a stream of digital images comprised of a plurality of individual digital images (Step 120). An individual image is, then, selected, from the stream of digital images by touching the touch display (Step 122). The selected individual image is automatically saved to a storage device (Step 124).

The method of capturing a digital image for viewing from a stream of digital images on a touch display of a digital imaging device contemplates that the stream of digital images is from a filed of stored digital images.

In an alternative embodiment, the stream of digital images is from a live feed of digital images.

The storage device can be an internal digital camera chip, a removable digital camera chip, a hard drive, optical media, or combinations thereof. As with the method for orienting a digital image for viewing on a touch display, the touch display can be is a pressure sensitive overlay on an LCD display or a membrane adapted to detect and induction from a device.

In addition to being employed on touch-screen devices, the methods can use any desktop image processing software. In this embodiment, an arrow would become visible when the mouse moves over a corner of the image. When selected, the rotation of the image would depend on the corner selected (according to the methods described herein).

A computer program product that is made using any of the embodied methods may include one or more storage mediums. For example, the computer program product can include magnetic storage media, such as magnetic disk, magnetic tape, random access memory, read only memory or any other physical device or media employed to store a computer program with instructions for controlling one or more computer to practice any of the embodied methods. The computer program product can include an optical storage media, such as an optical disk.

The embodiments have been described in detail with particular reference to certain preferred embodiments thereof, but it will be understood that variations and modifications can be effected within the scope of the embodiments, especially to those skilled in the art.

PARTS LIST 11. display
12. card
20. kiosk
22. touch display
23. top edge
24. input port 30. optional delivery section
32. digital device
34. communication network
36. computer
38. printer
40. output image
42. input image
44. removable media reader
46. removable media
48. first corner
50. second corner
52. third corner
54. fourth corner
100. step
102. step
104. step
106. step
108. first position
110. second orientation
112. third orientation
120. step
122. step

The invention claimed is:

1. A method of orienting a digital image for viewing on a touch display of a digital imaging device, the method comprising the steps of:
   a. accessing the digital image, wherein the digital image comprises a plurality of sides, wherein each of the plurality of sides is substantially linear;
   b. displaying the digital image in a first orientation on the touch display of the digital imaging device, wherein the touch display comprises at least three corners;
   c. providing selection means for selecting at least one of the corners; and
   d. automatically displaying the digital image in a second orientation responsive to the selecting of one of the corners, wherein the second orientation is configured such that the digital image rotates up to 360 degrees from the first orientation in the direction of the selected corner.

2. The method of claim 1, wherein the digital image rotates between 1 and 90 degrees from the first orientation in the direction of the selected corner.

3. The method of claim 1, wherein the digital image rotates in increments of 5 degrees each time the corner is selected.

4. The method of claim 3, wherein the digital image continues to rotate in the direction of the corner for as long as the corner is selected.

5. The method of claim 1, wherein the touch display is a pressure sensitive overlay on an LCD display or a membrane adapted to detect and induction from a device.

6. A method of capturing a digital image for viewing from a stream of digital images on a touch display of a digital imaging device, the method comprising the steps of:
   a. accessing a stream of digital images comprised of a plurality of individual digital images;
   b. selecting an individual image from the stream of digital images by touching the touch display; and
   c. automatically saving the selected individual image to a storage device.

7. The method of claim 6, wherein the stream of digital images is from a stored digital image screen.

8. The method of claim 6, wherein the stream of digital images is from a live feed of digital images.

9. The method of claim 6, wherein the storage device is an internal digital camera chip, a removable digital camera chip, a hard drive; optical media, or combinations thereof.

10. The method of claim 6, wherein the touch display is a pressure sensitive overlay on an LCD display or a membrane adapted to detect and induction from a device.

* * * * *